United States Patent [19]
Kawai et al.

[11] Patent Number: 5,254,397
[45] Date of Patent: Oct. 19, 1993

[54] CARBON FIBER-REINFORCED COMPOSITE MATERIAL HAVING A GRADIENT CARBIDE COATING

[75] Inventors: Chihiro Kawai; Tadashi Igarashi, both of Itami, Japan

[73] Assignee: Sumitomo Electric Industries, Ltd., Osaka, Japan

[21] Appl. No.: 895,458

[22] Filed: Jun. 8, 1992

Related U.S. Application Data

[63] Continuation of Ser. No. 623,186, Dec. 6, 1990, abandoned.

[30] Foreign Application Priority Data

Dec. 27, 1989 [JP] Japan .................................. 1-339557

[51] Int. Cl.$^5$ ...................... B32B 9/00; B32B 18/00; C04B 35/02; C04B 35/52
[52] U.S. Cl. ..................... 428/245; 428/288; 428/294; 428/408; 428/426; 428/428; 428/432; 428/688; 428/689; 428/697; 428/698; 428/902; 501/87; 501/88; 501/91; 501/95; 501/102
[58] Field of Search ............... 428/902, 610, 469, 408, 428/245, 288, 294, 426, 432, 688, 689, 697, 698; 427/255.2, 249, 255.7; 501/98, 87, 88, 91, 95, 102; 106/286.3

[56] References Cited

U.S. PATENT DOCUMENTS

| | | | |
|---|---|---|---|
| 3,019,128 | 1/1962 | Smiley | 428/469 |
| 4,264,682 | 4/1981 | Fuyama et al. | 427/249 |
| 4,751,099 | 6/1988 | Niino et al. | 427/34 |
| 4,844,951 | 7/1989 | Sarin et al. | 427/249 |

Primary Examiner—George F. Lesmes
Assistant Examiner—James D. Withers
Attorney, Agent, or Firm—Cushman, Darby & Cushman

[57] ABSTRACT

A coated carbon fiber-reinforced composite material comprising a substrate material which comprises a carbon or ceramic matrix and reinforcing carbon fibers and a coating layer which comprises silicon carbide and at least one material selected from the group consisting of titanium carbide, zirconium carbide and hafnium carbide, wherein a part of the coating layer contacting to the substrate consists of at least one material selected from the group consisting of titanium carbide, zirconium carbide and hafnium carbide, a surface part of the coating layer consists of silicon carbide and a composition in an intermediate part between the part contacting to the substrate and the surface part continuously or stepwise changes from at least one material selected from the group consisting of titanium carbide, zirconium carbide and hafnium carbide to silicon carbide, and a carbon fiber-reinforced composite material comprising a matrix which comprises carbon and oxidation resistant ceramic and reinforcing carbon fiber contained in the matrix and optionally a coating layer which comprises hafnium carbide, wherein both surface parts of the matrix consists of the oxidation resistant ceramic, a center part of the matrix consists of carbon and a composition in each of intermediate parts between each surface and the center part continuously or stepwise changes from the oxidation resistant ceramic to carbon, which have improved oxidation resistance and thermal shock resistance.

4 Claims, 2 Drawing Sheets

Substrate | HfC | HfC + SiC | SiC

Substrate | ZrC | ZrC + SiC | SiC

CARBON FIBER-REINFORCED COMPOSITE MATERIAL HAVING A GRADIENT CARBIDE COATING

This is a continuation of application No. 07/623,186, filed on Dec. 6, 1990, now abandoned.

BACKGROUND OF THE INVENTION

1. Field of the Invention

The present invention relates to a carbon fiber-reinforced composite material having a low specific gravity and excellent strength, heat resistance, oxidation resistance and thermal shock resistance.

2. Description of the Related Art

Since a carbon fiber-reinforced carbon composite material comprising a carbon matrix and reinforcing carbon fibers contained therein, namely a C/C composite has excellent heat resistance and strength properties at high temperatures, its application, for example, for an insulating material to be used in a space shuttle is expected and studied.

However, since the C/C composite comprises the carbon matrix, it has insufficient oxidation resistance although it has a low specific gravity and good strength properties.

To impart the oxidation resistance to the C/C composite, it is proposed to apply an oxidation resistant ceramic coating on the surface of C/C composite. However, since a difference between a coefficient of thermal expansion of the C/C composite and that of the ceramic coating is very large, the coating layer tends to be cracked due to thermal stress so that the ceramic coating is peeled off or the strength is greatly decreased.

A carbon fiber-reinforced ceramic composite material comprising a ceramic matrix and reinforcing carbon fibers contained therein, namely a C/ceramic composite has a larger coefficient of thermal expansion than the C/C composite. Therefore, when the ceramic coating is formed on the C/ceramic composite, the coating layer is not cracked due to the thermal stress and the composite has better oxidation resistance. However, the C/ceramic composite has much lower strength than the C/C composite, a large specific gravity and a large coefficient of thermal conductivity, so that the C/ceramic composite is inferior in weight reduction and heat shielding property to the C/C composite.

SUMMARY OF THE INVENTION

One object of the present invention is to provide a carbon fiber-reinforced composite material having excellent oxidation resistance, thermal shock resistance and strength properties.

Another object of the present invention is to provide a carbon fiber-reinforced carbon or ceramic composite material having a coating layer of a ceramic.

According to a first aspect of the present invention, there is provided a coated carbon fiber-reinforced composite material comprising a substrate material which comprises a carbon or ceramic matrix and reinforcing carbon fibers and a coating layer which comprises silicon carbide and at least one material selected from the group consisting of titanium carbide, zirconium carbide and hafnium carbide, wherein a part of said coating layer contacting to said substrate consists of at least one material selected from the group consisting of titanium carbide, zirconium carbide and hafnium carbide, a surface part of said coating layer consists of silicon carbide and a composition in an intermediate part between the part contacting to the substrate and the surface part continuously or stepwise changes from at least one material selected from the group consisting of titanium carbide, zirconium carbide and hafnium carbide to silicon carbide.

According to a second aspect of the present invention, there is provided a carbon fiber-reinforced composite material comprising a matrix which comprises carbon and oxidation resistant ceramic and reinforcing carbon fiber contained in said matrix and optionally a coating layer which comprises hafnium carbide, wherein both surface parts of said matrix consists of the oxidation resistant ceramic, a center part of said matrix consists of carbon and a composition in each of intermediate parts between each surface and the center part continuously or stepwise changes from said oxidation resistant ceramic to carbon.

DETAILED DESCRIPTION OF THE INVENTION

Figure 1:
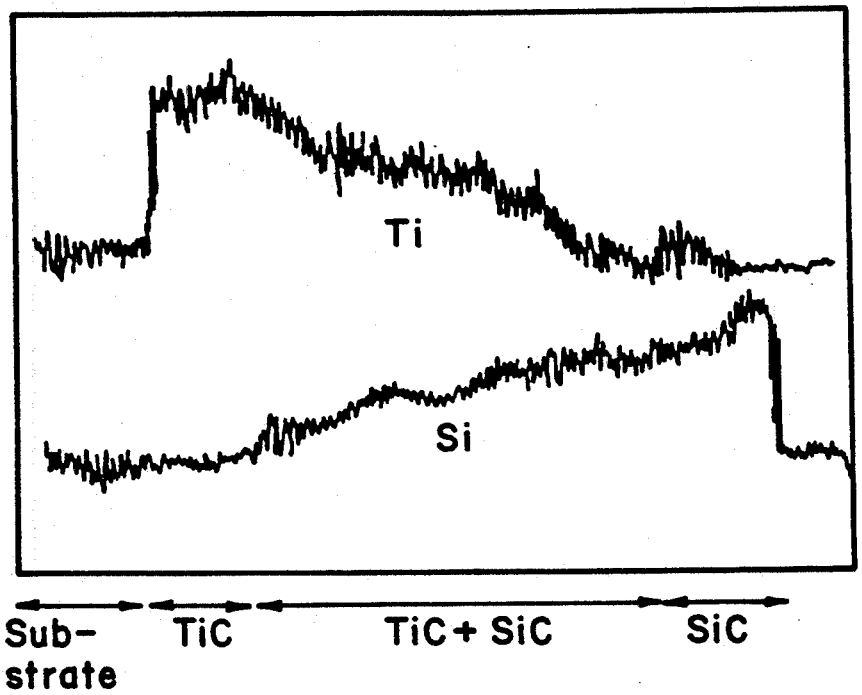
FIGS. 1–4 are the EPMA charts obtained in Examples 1 and 2.

In the coated carbon fiber-reinforced composite material according to the first aspect of the present invention, the coating layer having the gradient composition can be prepared by a conventional method such as a chemical vapor deposition (CVD) method or a physical vapor deposition (PVD) method. Among them, the CVD method is preferred because of a large film forming rate and easy control of the composition.

In this coated carbon fiber-reinforced composite, the exposed surface of the coating layer consists of silicon carbide (SiC) having good oxidation resistance, and the part of the coating layer contacting to the substrate consists of titanium carbide (TiC), zirconium carbide (ZrC) or hafnium carbide (HfC), and the composition of the intermediate layer continuously changes from titanium carbide, zirconium carbide or hafnium carbide of the part contacting to the substrate to silicon carbide of the surface.

Accordingly, the coefficient of thermal expansion of the coating layer is larger at the part contacting to the substrate than at the surface. For example, titanium carbide has the coefficient of thermal expansion of $7.6 \times 10^{-6}/K$, and silicon carbide has the thermal expansion of $4.6 \times 10^{-6}/K$. In addition, the composition has a gradient and then the coefficient of thermal expansion continuously decreases from the substrate side to the surface in the coating layer. Therefore, not only the surface layer consisting of silicon carbide is not cracked, but also the thermal stress caused by heat cycles can be reduced, so that the oxidation resistance and the thermal shock resistance are simultaneously improved.

Since the coating layer comprises silicone carbide and other ceramics such as titanium carbide and has a gradient composition, compression residual stress is generated in the surface part consisting of silicon carbide when the composite is heated, whereby the thermal cracks do not reach the silicon carbide surface part. This is achieved by forming the part containing to the substrate from other ceramic such as titanium carbide having the larger coefficient of thermal expansion. If the composition in the coating layer has no gradient, the compression stress becomes too large so that the coating layer may be peeled off.

When a thickness of the coating layer is 0.05 mm or larger, the coating layer has an increased heat shielding effect. If the thickness of the coating layer is larger than 5 mm, it takes very long time to form the coating layer. Therefore, the thickness of the coating layer is preferably from 0.05 to 5 mm.

In the carbon fiber-reinforced composite material according to the second aspect of the present invention, since the surfaces of the matrix consists of the oxidation resistant ceramic, the composite material has good oxidation resistance, and since the center part of the matrix consists of carbon, the composite material has good strength properties. In addition, since the composition in each of the intermediate parts between each surface and the center part continuously or stepwise changes from the oxidation resistant ceramic to carbon, the coefficient of thermal expansion continuously or stepwise changes according to the gradient of the composition, so that the generation of thermal stress is suppressed and the thermal shock resistance is improved.

As the heat resistant ceramic, carbides, nitrides and carbonitrides of the elements of the IVA group in the Periodic Table (e.g. titanium, zirconium and hafnium), boron and silicon are preferred. Among them, titanium carbide and zirconium nitride are preferred because of good heat shielding effects. For example, the C/TiC composite and the C/ZrN composite have coefficients of thermal coefficient of $4.4 \times 10^{-6}$/K and $4.0 \times 10^{-6}$/K, respectively.

In a preferred embodiment, the carbon fiber-reinforced composite material according to the second aspect of the present invention has a coating layer of hafnium carbide or a coating layer comprising hafnium carbide and silicone carbide and having a gradient composition such that a part of the coating layer contacting to the composite material consists of silicon carbide, a surface of the coating layer consists of hafnium carbide, and a composition in an intermediate part between the part contacting to the substrate and the surface continuously or stepwise changes from silicon carbide to hafnium carbide.

In this preferred embodiment, the carbon fiber-reinforced composite material has a coefficient of thermal expansion of about $4 \times 10^{-6}$/K and close to that of hafnium carbide ($6.3 \times 10^{-6}$/K). In addition, since the composition in each of the intermediate parts between each surface and the center part continuously or stepwise changes from the oxidation resistant ceramic to carbon, the coefficient of thermal expansion continuously or stepwise changes according to the gradient of the composition, so that the generation of thermal stress is suppressed and the generation of cracks in the coating layer can be prevented.

Further, since hafnium carbide in the coating layer or the surface of the coating layer of this preferred embodiment has excellent heat resistance and oxidation resistance, the heat resistance and oxidation resistance of the composite material are further improved.

When the coating layer has the gradient composition of hafnium carbide and silicon carbide, the coefficients of the composite material and the coating layer can be made very close to each other at the interface between them, and the coefficient of thermal expansion in the intermediate layers can be continuously or stepwise changed, so that the thermal shock resistance is further improved.

The composite material having the gradient composition can be produced by a conventional method. Detailed procedures are explained in the following Examples.

The present invention will be explained further in detail by following Examples.

EXAMPLE 1

On a substrate material consisting of a carbon fiber/carbon composite material containing a two-dimensionally woven carbon fiber fabric (25×25×5 mm) as a reinforcing material, a coating layer having a gradient composition of TiC and SiC was formed by the CVD method with changing a flow rate of $TiCl_4$ from 0.3 l/min. to 0 l/min. at a changing rate of 0.1 l/hr., a flow rate of $SiCl_4$ from 0 l/min. to 0.6 l/min. at a changing rate of 0.2 l/hr. and a flow rate of $CH_4$ from 0.15 l/min. to 0 4/min. at a changing rate of 0.083 l/hr.

The composition of the deposited coating layer was analyzed along the cross section with the electron probe micro analysis (EPMA) and the result is shown in FIG. 1, from which it is understood that the composition of the coating continuously changed from TiC in the part contacting to the substrate to SiC in the surface.

Then, the produced coated material was heated in the air at 1400° C. for one hour and its oxidation resistance was evaluated from the change of weight before and after heating.

The same sample was subjected to the thermal shock resistance test by keeping it in a furnace heated at 1500° C. for one minute and introducing it in water and a peeling state of the coating was observed.

For comparison, a two-layer coating wherein a lower layer contacting to the substrate was made of TiC and an upper layer was made of SiC was formed on the substrate material (Sample Nos. 2, 3 and 4) and subjected to the same oxidation resistance test and thermal shock resistance test.

The results are shown in Table 1 together with the thicknesses of the coating.

TABLE 1

| Sample No. | Coating (μm) | Weight loss (mg/cm²) | Peeling of coating |
|---|---|---|---|
| 1 | TiC—SiC gradient composition (181) | 0.4 | No |
| 2 | TiC/SiC (12/168) | 0.8 | Yes |
| 3 | TiC/SiC (21/160) | 2.2 | Yes |
| 4 | TiC/SiC (33/145) | 0.9 | Yes |

When the coating has the gradient composition, the oxidation and thermal shock resistances are improved.

EXAMPLE 2

Figure 2:
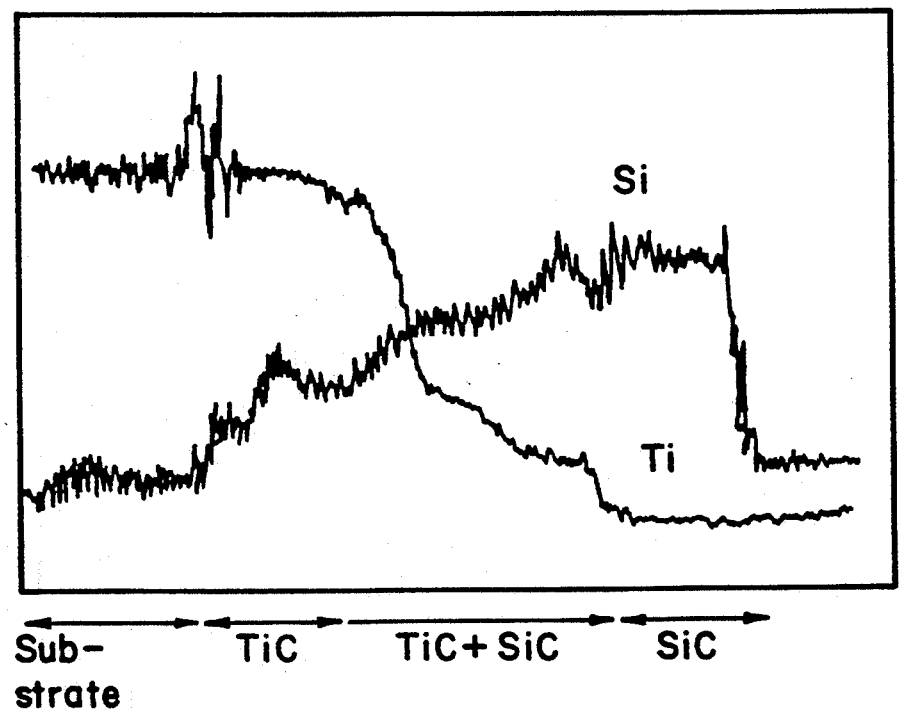
Figure 3:
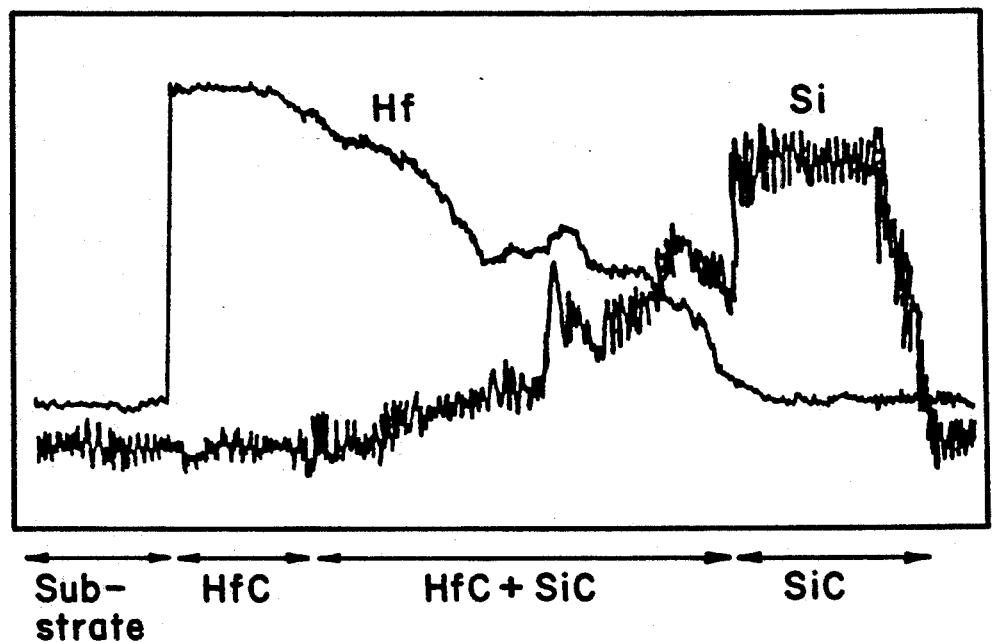
Figure 4:
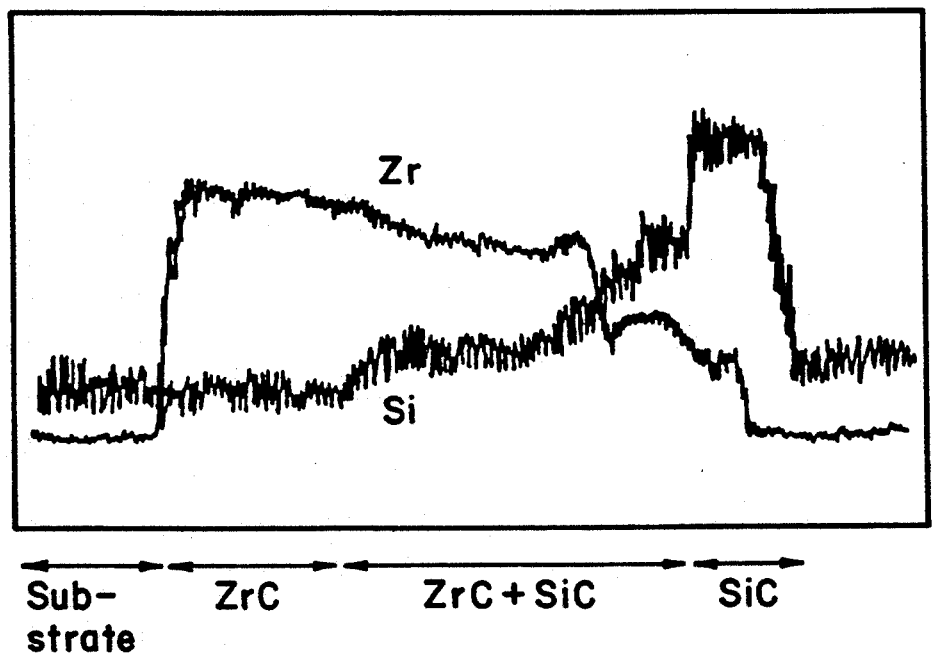

On a substrate material consisting of a carbon fiber/ceramic composite material containing carbon fibers in the TiC matrix, a coating layer having a gradient composition of TiC and SiC, HfC and SiC or ZrC and SiC by the CVD method with changing the flow rates of the raw materials. The composition of each coating layer was analyzed by EPMA. The EPMA charts are shown in FIGS. 2, 3 and 3. From these charts, it is understood that the composition continuously changed from TiC, HfC or ZrC in the part contacting to the substrate to SiC in the surface.

Each sample was set on a thermobalance, heated from room temperature to 1300° C. at a heating rate of 20° C./min. and kept standing at 1300° C. for ten hours. Weight loss due to oxidation after heating was measured. After heating, the hot sample was quenched in liquid nitrogen and a load was measured by a scratch tester till the coating was peeled off.

For comparison, a two-layer coating wherein a lower layer contacting to the substrate was made of TiC, HfC or ZrC and an upper layer was made of SiC was formed on the substrate material (Sample Nos. 8, 9 and 10) and subjected to the same tests.

The results are shown in Table 2 together with the thicknesses of the coating.

TABLE 2

| Sample No. | Coating (μm) | Weight loss (mg/cm$^2$) | Load for peeling a coating (N) |
|---|---|---|---|
| 5 | TiC—SiC gradient composition (181) | 1.6 | 120 |
| 6 | HfC—SiC gradient composition (98) | 0.8 | 142 |
| 7 | ZrC—SiC gradient composition (102) | 3.2 | 135 |
| 8 | TiC/SiC (22/75) | 10.5 | 50 |
| 9 | HfC/SiC (22/79) | 7.2 | 25 |
| 10 | ZrC/SiC (20/83) | 19.5 | 43 |

EXAMPLE 3

As matrix components, carbon powder having an average particle size of 2 μm and SiC powder were mixed with a small amount of Al$_2$O$_3$ powder at a ratio of SiC/(SiC+C) of 0, 20, 40, 60, 80 or 100% by mole to prepare each powder mixture.

Each powder mixture was kneaded with an acrylamide resin and dispersed in a bath liquid for electrophoresis. In the bath liquid, a cathode made of a woven fabric of PAN type carbon fibers and an anode made of a carbon plate were immersed and a voltage of about 200 V was applied between them for 10 minutes while stirring well. By electrophoresis, particles of the powder mixture were deposited on the carbon fiber fabric to obtain a composite material consisting of the carbon fiber fabric as the reinforcing material and the powder mixture having the above SiC/(SiC+C) ratio.

Then, eleven sheets of the obtained composite materials were laminated according to the composition combination as shown in Table 3 and dried at 100° C. for one hour and then at 500° C. for 3 hours to remove volatile materials. The dried laminate was sintered at 2000° C. under 200 kg/cm$^2$ for 2 hours to obtain a carbon fiber-reinforced composite material having a thickness of 3 mm. The Sample Nos. 12, 13 and 14 are Comparative Samples.

TABLE 3

| Sample No. | Matrix compositions of composite materials in the order of lamination (% by mole of SiC) |
|---|---|
| 11 | 100-80-60-40-20-0 (= carbon 100%)-20-40-60-80-100 |
| 12 | 100-100-0-0-0-0-0-0-0-100-100 |
| 13 | SiC 100% in all of eleven sheets. |
| 14 | Carbon 100% in all of eleven sheets. |

The oxidation resistance and bending strength of each sample were measured. The oxidation resistance was evaluated from the weight loss after heating the sample (25×25×3 mm) in the air at 1400° C. for one hour without exposing the four side edges to the air. The bending strength was measured on the same sample of the sizes of 40×4×3 mm by the three-point bending test. The results are shown in Table 4.

TABLE 4

| Sample No. | Matrix | Weight loss (mg/cm$^2$) | Bending strength (MPa) |
|---|---|---|---|
| 11 | C—SiC gradient composition | 8.6 | 206 |
| 12 | C—SiC non-gradient composition | 8.8 | 185 |
| 13 | All SiC | 8.6 | 100 |
| 14 | All carbon | 250.4 | 210 |

The carbon fiber-reinforced composite material of the present invention has better oxidation resistance and bending strength than the comparative materials.

EXAMPLE 4

Each sample produced in the same manner as in Example 3 was quickly heated in a furnace kept at 1300° C. and kept at 1300° C. for 50 minutes. Then, the hot sample was quenched in liquid nitrogen. The above heating and quenching cycle was repeated three times and the bending strength of the sample was measured in the same manner as in Example 3.

After heating and quenching cycles, the bending strength was 211 MPa, 104 MPa, 102 MPa and 212 MPa for the Sample Nos. 11, 12, 13 and 14, respectively. It is seen that the sample No. 12 consisting of non-gradient composition of C-SiC significantly lost the strength due to cracking.

EXAMPLE 5

In the same manner as in Example 3 but using TiC in place of SiC, the composite material was produced according to the composition combination as shown in Table 5. The Sample Nos. 16 and 17 are Comparative Samples.

TABLE 5

| Sample No. | Matrix compositions of composite materials in the order of lamination (% by mole of TiC) |
|---|---|
| 15 | 100-80-60-40-20-0 (= carbon 100%)-20-40-60-80-100 |
| 16 | 100-100-0-0-0-0-0-0-0-100-100 |
| 17 | TiC 100% in all of eleven sheets. |

Each sample was cut to sizes of 25×25 mm (thickness of 3 mm) for the oxidation resistance test and to sizes of 40×4 mm (thickness of 3 mm) for bending test. Then, the cut samples were quickly heated to 1000° C. in the furnace, kept at 1000° C. for 10 hours and quenched in liquid nitrogen. Thereafter, the weight loss and the bending strength were measured. The results are shown in Table 6.

TABLE 6

| Sample No. | Matrix | Weight loss (mg/cm$^2$) | Bending strength (MPa) |
|---|---|---|---|
| 15 | C—TiC gradient composition | 52.5 | 188 |
| 16 | C—TiC non-gradient composition | 53.0 | 120 |
| 13 | All TiC | 50.5 | 105 |

EXAMPLE 6

As matrix components, carbon powder having an average particle size of 2 μm and TiC powder were mixed with a small amount of Al$_2$O$_3$ powder at a ratio of TiC/(TiC+C) of 0, 20, 40, 60, 80 or 100% by mole to prepare each powder mixture.

Each powder mixture was kneaded with an acrylamide resin and dispersed in a bath liquid for electrophoresis. In the bath liquid, a cathode made of a woven fabric of PAN type carbon fibers and an anode made of a carbon plate were immersed and a voltage of about 200 V was applied between them for about 10 minutes while stirring well. By electrophoresis, particles of the powder mixture were deposited on the carbon fiber fabric to obtain a composite material consisting of the carbon fiber fabric as the reinforcing material and the powder mixture having the above TiC/(TiC+C) ratio.

Then, eleven sheets of the obtained composite materials were laminated according to the composition combination order of 100-80-60-40-20-0-20-40-60-80-100(%) and dried at 100° C. for one hour and then at 500° C. for 3 hours to remove volatile materials. The dried laminate was sintered at 2000° C. under 200 kg/cm$^2$ for 2 hours to obtain a carbon fiber-reinforced composite material having a length of 50 mm, a width of 50 mm and a thickness of 3 mm.

On the surface of the substrate, a coating of about 200 μm in thickness was formed from pure HfC or SiC-HfC HfC having a gradient composition. In the formation of SiC-HfC HfC gradient composition coating, SiCl$_4$, HfCl$_4$ and CH$_4$ were used as reactant gases and hydrogen gas as a carrier gas, and a flow rate of SiCl$_4$ was decreased from 0.75 l/min. to 0 l/min. at a changing rate of 0.25 l/hr., a flow rate of HfCl$_4$ was increased from 0 l/min. to 1.2 l/min. at a changing rate of 0.4 l/hr., and CH$_4$ was supplied at a constant flow rate of 0.3 l/min. The reactants were reacted at 1500° C. under pressure of 180 Torr for 3 hours.

For comparison, on a C/C composite or a C/TiC composite, a coating of HfC was formed.

A coefficient of thermal conductivity was measured by a laser flash method and a specific gravity (bulk density) was also measured. Then, the sample was heated in the air at 1700° C. for 3 hours and a weight loss due to oxidation was measured. Bending strength of the sample was measured before and after heating it at 1500° C. for one hour and quenching it in water. The results are shown in Table 7.

TABLE 7

| | Example 6 | | Comparison | |
|---|---|---|---|---|
| Substrate | C/C—TiC gradient composition | | C/TiC | C/C |
| Coating | HfC | SiC—HfC | HfC | HfC |
| (thickness, μm) | (185) | gradient composition (199) | (204) | (210) |
| Coefficient of thermal conductivity (W/mK) | 7.7 | 7.0 | 19.0 | 6.9 |
| Specific gravity (g/cm$^3$) | 2.20 | 2.18 | 3.30 | 1.72 |
| Weight loss (mg/cm$^2$/hr) | 0 | 0 | 0 | 120.5 |
| Bending strength (MPa) | | | | |
| Before heating and quenching | 245 | 249 | 120 | 250 |
| After heating and quenching | 240 | 249 | 75 | 233 |

EXAMPLE 7

In the same manner as in Example 6 but using carbon powder having an average particle size of 3 μm and ZrN powder or SiC powder, carrying out the electrophoresis for 20 minutes to produce each composite sheet, changing the compositions of the substrate matrixes as in Example 6, and sintering the laminated substrate at 2200° C., a C/C-ZrN or C/C-SiC composite was produced. The coating was formed in the same manner as in Example 6.

For comparison, on a C/C composite, a C/ZrN composite or a C/SiC composite, a coating of HfC was formed.

The properties of the produced samples are shown in Table 8.

TABLE 7

| | Example 7 | | | | Comparison | | |
|---|---|---|---|---|---|---|---|
| Substrate | C/C—ZrN gradient composition | | C/C—SiC gradient composition | | C/ZrN | C/SiC | C/C |
| Coating (thickness, μm) | HfC (220) | SiC—HfC gradient composition (215) | HfC (200) | SiC—HfC gradient composition (208) | HfC (220) | HfC (220) | HfC (221) |
| Coefficient of thermal conductivity (W/mK) | 6.6 | 6.5 | 12.5 | 13.9 | 20.0 | 35.3 | 6.9 |
| Specific gravity (g/cm$^3$) | 2.15 | 2.17 | 1.89 | 1.89 | 3.08 | 2.52 | 1.72 |
| Weight loss (mg/cm$^2$/hr) | 0 | 0 | 1.55 | 0 | 0 | 2.05 | 99.4 |
| Bending strength (MPa) | | | | | | | |
| Before heating and quenching | 229 | 250 | 201 | 230 | 109 | 123 | 230 |
| After heating and quenching | 220 | 250 | 195 | 222 | 75 | 80 | 230 |

While the comparative sample comprising the C/C composite as the substrate had poor oxidation resistance, and the comparative samples comprising the C/TiC, C/ZrN and C/SiC composites as the substrates had large specific gravities and poor thermal insulation and bending strength, the samples of the present invention comprising the C/C-ZrN and C/C-SiC composites having the gradient composition as the substrates had the small gravities and good thermal insulation, large strength and improved oxidation resistance and thermal shock resistance. In addition, the coating having the gradient composition further improved the properties.

What is claimed is:

1. A coated carbon fiber-reinforced composite material comprising a substrate material which comprises a carbon matrix and reinforcing carbon fibers and a coating layer coating the substrate material which comprises silicon carbide and at least one material selected from the group consisting of titanium carbide, zirconium carbide and hafnium carbide wherein a part of said coating layer contacting said substrate material consists of at least one material selected from the group consisting of titanium carbide, zirconium carbide and hafnium carbide, a surface part of said coating layer consists of silicon carbide and a composition in an intermediate part between the part contacting the substrate material and the surface part continuously or stepwise changes from at least one material selected from the group consisting of titanium carbide, zirconium carbide and hafnium carbide to silicon carbide.

2. The coated carbon fiber-reinforced composite material according to claim 1, wherein said coating layer has a thickness of from 0.05 to 5 mm.

3. A coated carbon fiber-reinforced composite material comprising a substrate material which comprises a ceramic matrix and reinforcing carbon fibers and a coating layer coating the substrate material which comprises silicon carbide and at least one material selected from the group consisting of titanium carbide, zirconium carbide and hafnium carbide.

wherein a part of said coating layer contacting said substrate material consists of at least one material selected from the group consisting of titanium carbide, zirconium carbide and hafnium carbide, a surface part of said coating layer consists of silicon carbide and a composition in an intermediate part between the part contacting the substrate material and the surface part continuously or stepwise changes from at least one material selected from the group consisting of titanium carbide, zirconium carbide and hafnium carbide to silicon carbide.

4. The coated carbon fiber-reinforced composite material according to claim 3, wherein said coating layer has a thickness of from 0.05 to 5 mm.

* * * * *